United States Patent
Berner et al.

(10) Patent No.: US 12,521,211 B2
(45) Date of Patent: Jan. 13, 2026

(54) DENTAL IMPLANT

(71) Applicant: STRAUMANN HOLDING AG, Basel (CH)

(72) Inventors: Simon Berner, Basel (CH); Adrian Rohner, Spiez (CH)

(73) Assignee: STRAUMANN HOLDING AG, Basel (CH)

( * ) Notice: Subject to any disclaimer, the term of this patent is extended or adjusted under 35 U.S.C. 154(b) by 1332 days.

(21) Appl. No.: 16/604,809

(22) PCT Filed: Apr. 10, 2018

(86) PCT No.: PCT/EP2018/059171
§ 371 (c)(1),
(2) Date: Oct. 11, 2019

(87) PCT Pub. No.: WO2018/189185
PCT Pub. Date: Oct. 18, 2018

(65) Prior Publication Data
US 2020/0078142 A1  Mar. 12, 2020

(30) Foreign Application Priority Data
Apr. 11, 2017 (EP) .................................... 17166032

(51) Int. Cl.
*A61C 8/00* (2006.01)
*A61K 6/20* (2020.01)
*A61K 6/818* (2020.01)

(52) U.S. Cl.
CPC .......... *A61C 8/0013* (2013.01); *A61C 8/0087* (2013.01); *A61K 6/20* (2020.01); *A61K 6/818* (2020.01); *A61C 2008/0046* (2013.01)

(58) Field of Classification Search
CPC ... A61C 8/0012; A61C 8/0013; A61C 8/0015; A61C 8/0087; A61C 2008/0046
(Continued)

(56) References Cited

U.S. PATENT DOCUMENTS 5,023,114 A * 6/1991 Halpern ................. C08J 7/0427
427/407.1
6,110,483 A * 8/2000 Whitbourne ............ A61L 29/16
424/94.64
(Continued)

FOREIGN PATENT DOCUMENTS

DE     112012003033 T5 *  7/2014  .......... A61B 17/866
EP     0 388 576 A1        9/1990
(Continued)

OTHER PUBLICATIONS

Meredith, English translation of description of DE-112012003033-T5, 2014 (Year: 2014).*
(Continued)

*Primary Examiner* — Heidi M Eide
*Assistant Examiner* — Sydney J Pulvidente
(74) *Attorney, Agent, or Firm* — Oliff PLC

(57) ABSTRACT

A dental implant made of a ceramic material including an implant surface having at least partially a contact angle of less than 20°, the implant surface being at least partially covered by a protective layer. The protective layer includes a dextran having a molecular weight of more than 15,000 Da.

28 Claims, 9 Drawing Sheets

Anchoring part of a two-part implant system

(58) Field of Classification Search
USPC .................................................. 606/300
See application file for complete search history.

(56) References Cited

U.S. PATENT DOCUMENTS

| | | | |
|---|---|---|---|
| 9,255,100 B2* | 2/2016 | Klar | A61P 37/02 |
| 2003/0167093 A1* | 9/2003 | Xu | A61L 27/425 |
| | | | 623/23.75 |
| 2004/0029075 A1 | 2/2004 | Peltier et al. | |
| 2004/0137582 A1* | 7/2004 | Dordick | C08B 37/0021 |
| | | | 514/54 |
| 2005/0181978 A1* | 8/2005 | Rojkjaer | C12Y 304/21027 |
| | | | 424/94.64 |
| 2005/0255142 A1* | 11/2005 | Chudzik | A61L 31/16 |
| | | | 424/426 |
| 2007/0270858 A1* | 11/2007 | Trieu | A61B 17/7098 |
| | | | 606/279 |
| 2009/0099579 A1* | 4/2009 | Nentwick | A61F 2/0077 |
| | | | 606/232 |
| 2009/0132048 A1 | 5/2009 | Denzer | |
| 2010/0082072 A1* | 4/2010 | Sybert | A61B 17/686 |
| | | | 606/86 R |
| 2011/0053113 A1 | 3/2011 | Schnabelrauch et al. | |
| 2013/0189371 A1* | 7/2013 | Lamberti | A61L 27/20 |
| | | | 424/602 |
| 2014/0172028 A1 | 6/2014 | Meredith | |
| 2014/0178639 A1* | 6/2014 | Berner | A61L 27/50 |
| | | | 427/2.27 |
| 2016/0237541 A1* | 8/2016 | Patel | B21C 23/002 |
| 2017/0145120 A1* | 5/2017 | Vuillemin | C08B 37/0021 |
| 2017/0247669 A1* | 8/2017 | Vuillemin | A61K 31/721 |
| 2019/0000763 A1* | 1/2019 | Pilgaonkar | A61K 9/4808 |

FOREIGN PATENT DOCUMENTS

| | | | | |
|---|---|---|---|---|
| EP | 0 388 576 B1 | 9/1993 | | |
| EP | 1 982 670 B1 | 9/2009 | | |
| EP | 1 982 671 B1 | 3/2016 | | |
| EP | 2992908 A1 * | 3/2016 | | A61L 27/06 |
| WO | 00/44305 A1 | 8/2000 | | |
| WO | 03/030957 A1 | 4/2003 | | |
| WO | WO-03074084 A1 * | 9/2003 | | A61K 31/192 |
| WO | 2008/098976 A2 | 8/2008 | | |
| WO | 2012/175220 A1 | 12/2012 | | |

OTHER PUBLICATIONS

Park et al., "Use of polyelectrolyte thin films to modulate Osteoblast response to microstructured titanium surfaces," Biomaterials, 2012, vol. 33, pp. 5267-5277.

Sartoretto et al., "Early osseointegration driven by the surface chemistry and wettability of dental implants," Journal of Applied Oral Science, 2015, vol. 23, No. 3, pp. 279-287.

Jul. 4, 2018 International Search Report issued in International Patent Application No. PCT/EP2018/059171.

Jul. 4, 2018 Written Opinion of the International Searching Authority issued in International Patent Application No. PCT/EP2018/059171.

* cited by examiner

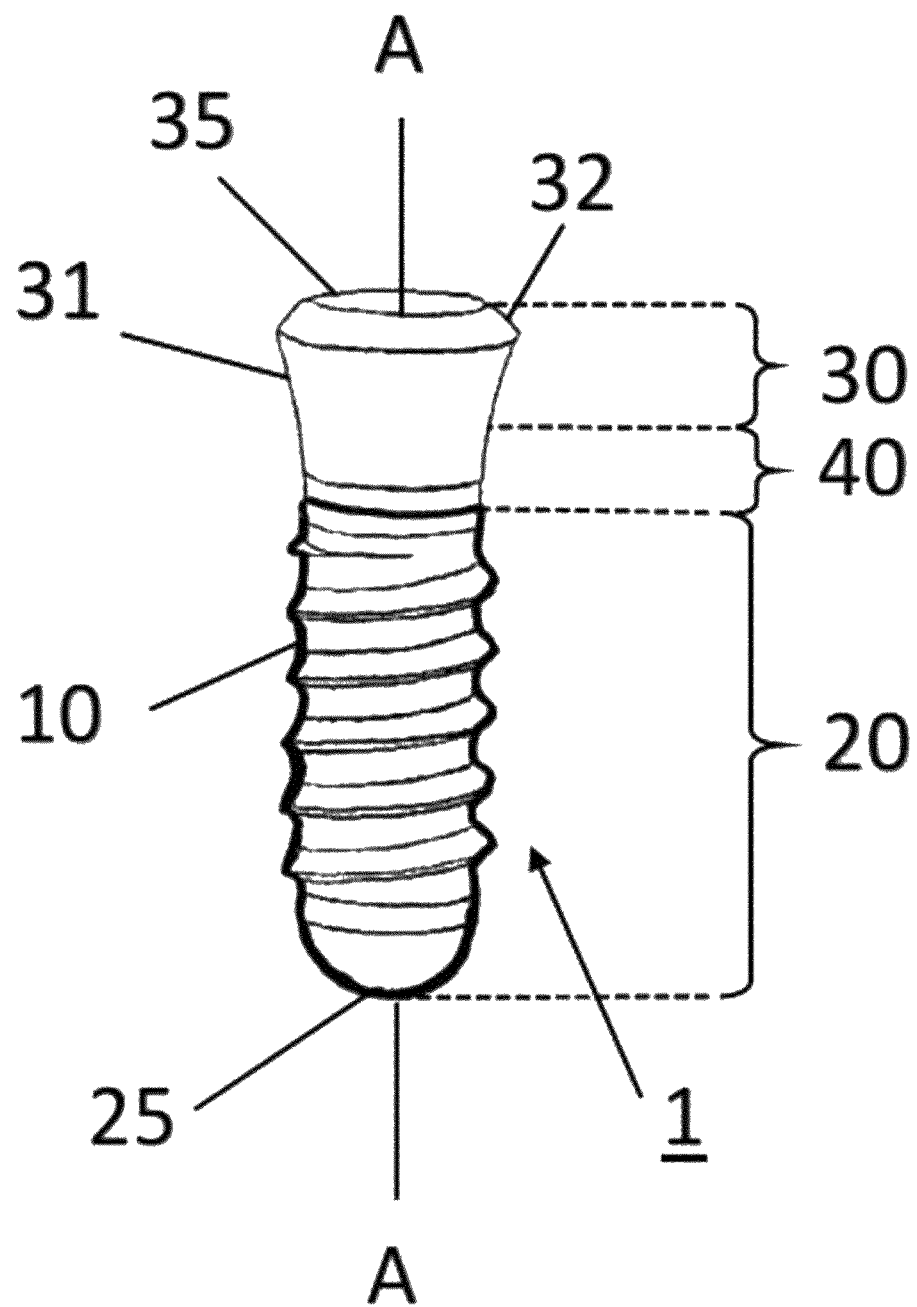
Figure 1: Anchoring part of a two-part implant system

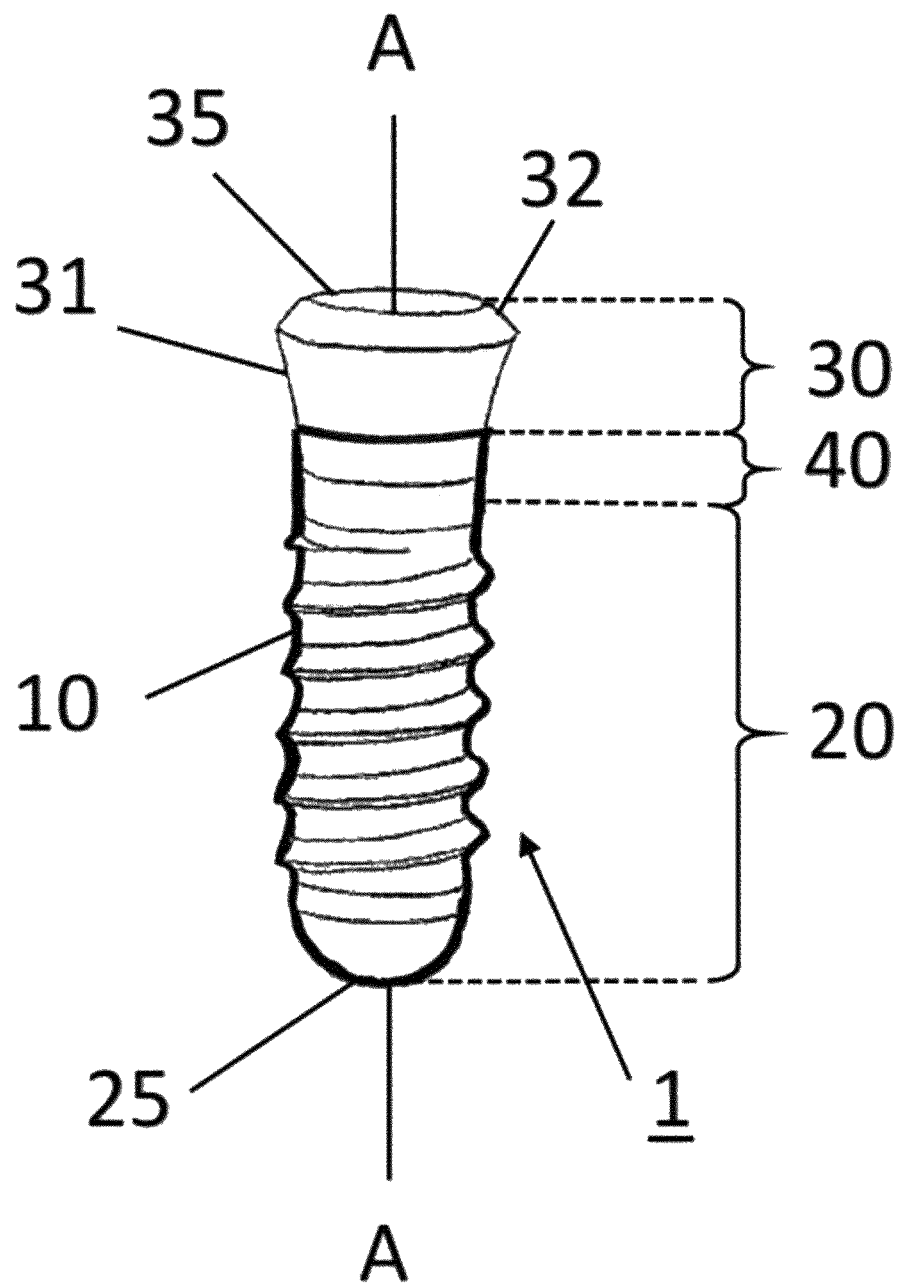
Figure 2: Anchoring part of a two-part implant system

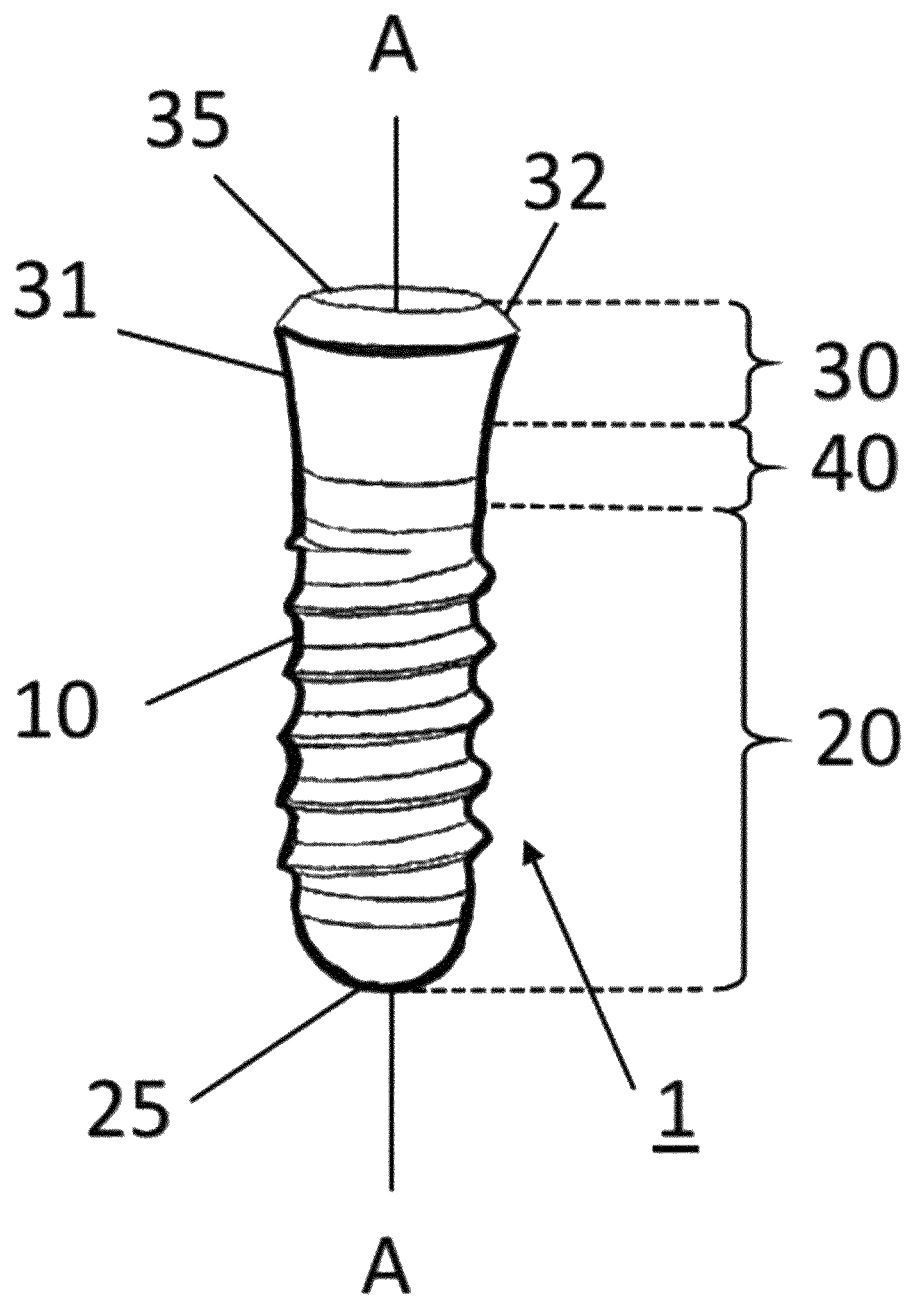
Figure 3: Anchoring part of a two-part implant system

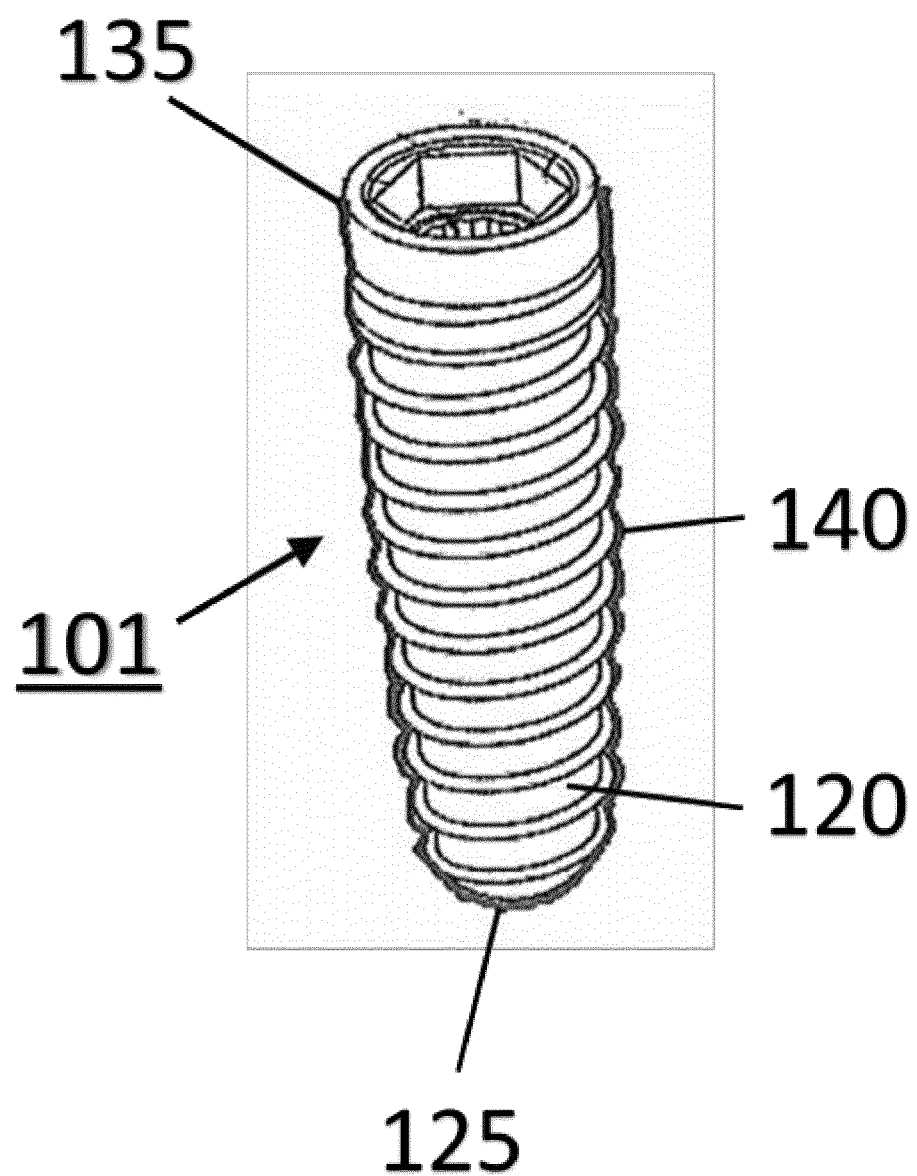
Figure 4: Anchoring part of a bone level implant

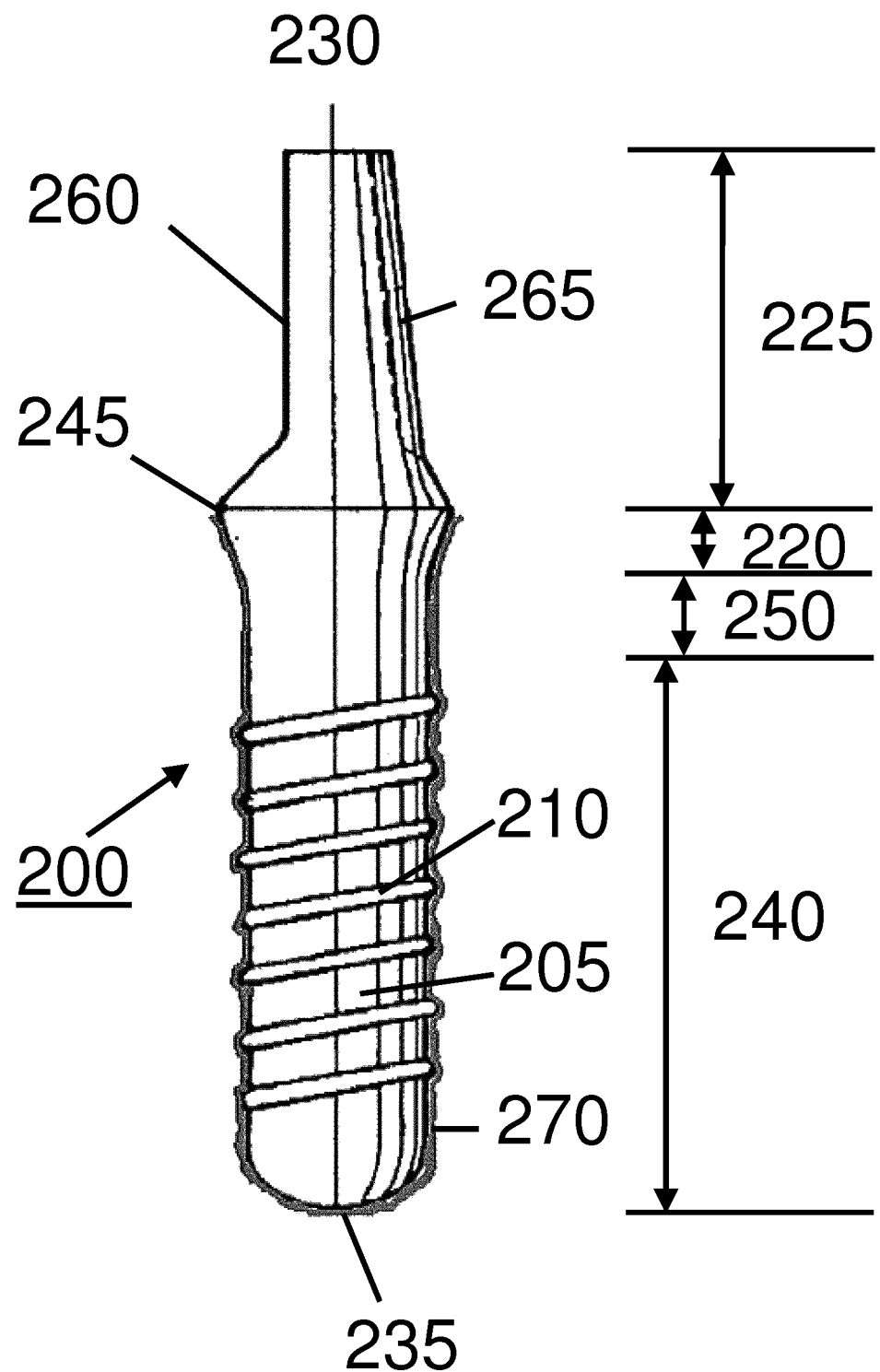
Figure 5: Monotype dental implant

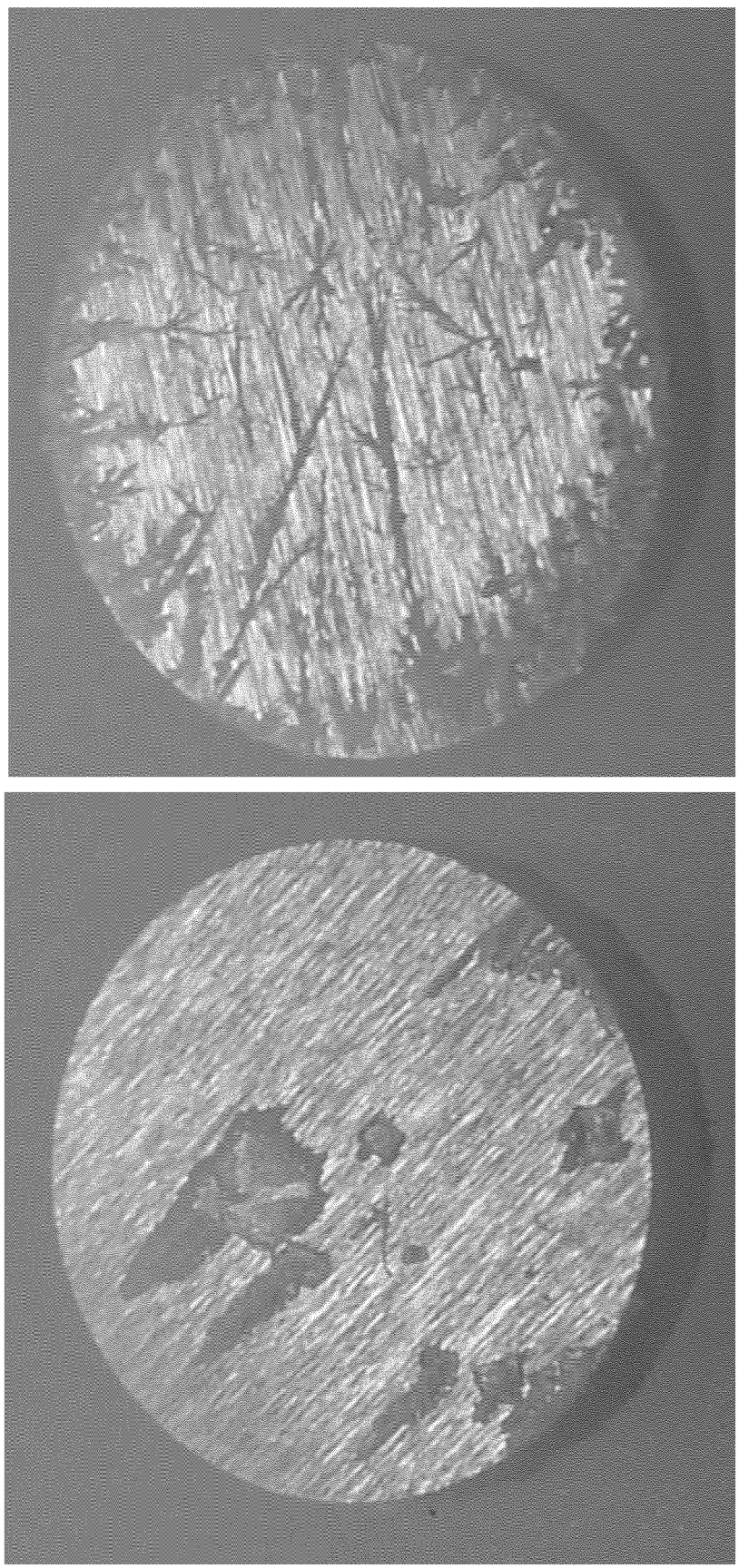
Figure 6: Sample coated with NaCl 1 M (left), KCl 1 M (right)

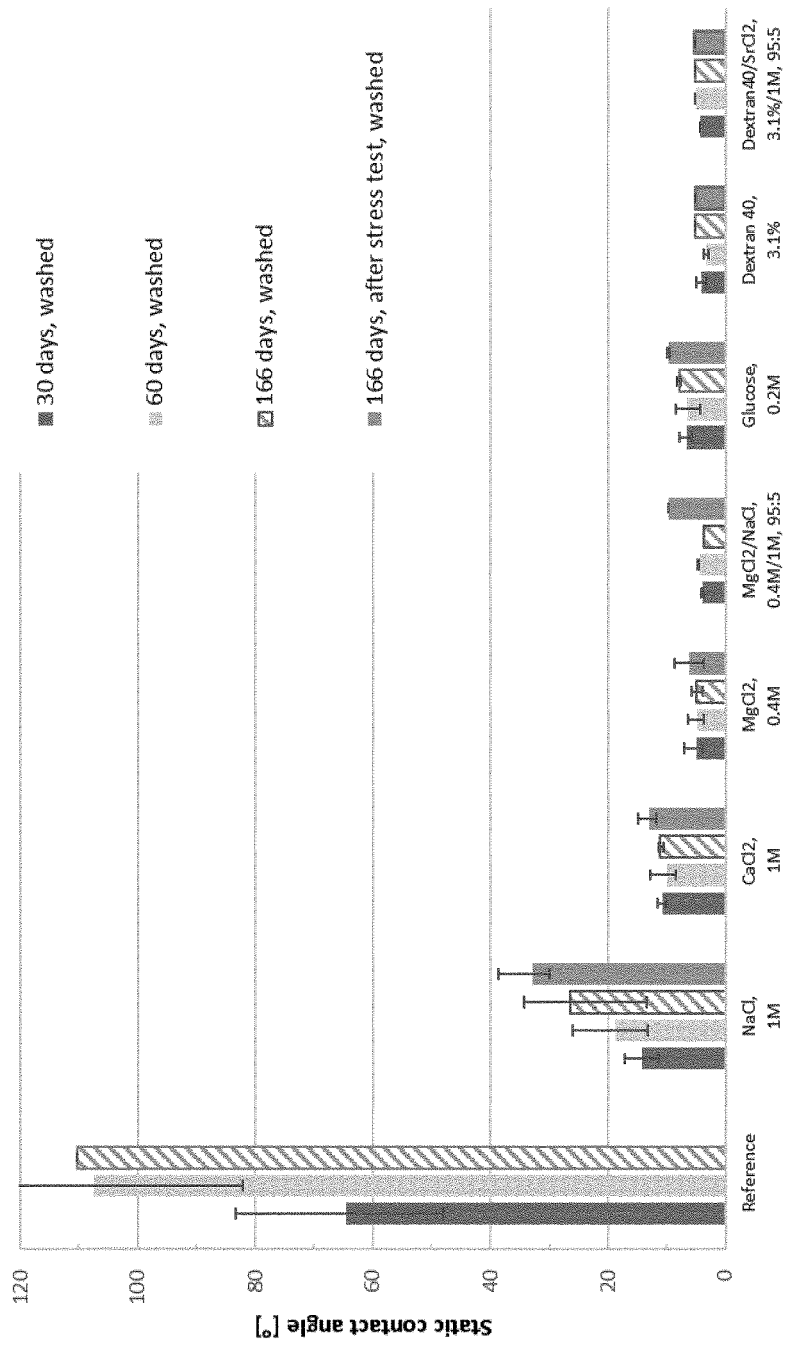
Figure 7: Static contact angle measurements of ZLA discs stored for 30, 60 and 166 days and washed with ultrapure water before measurement

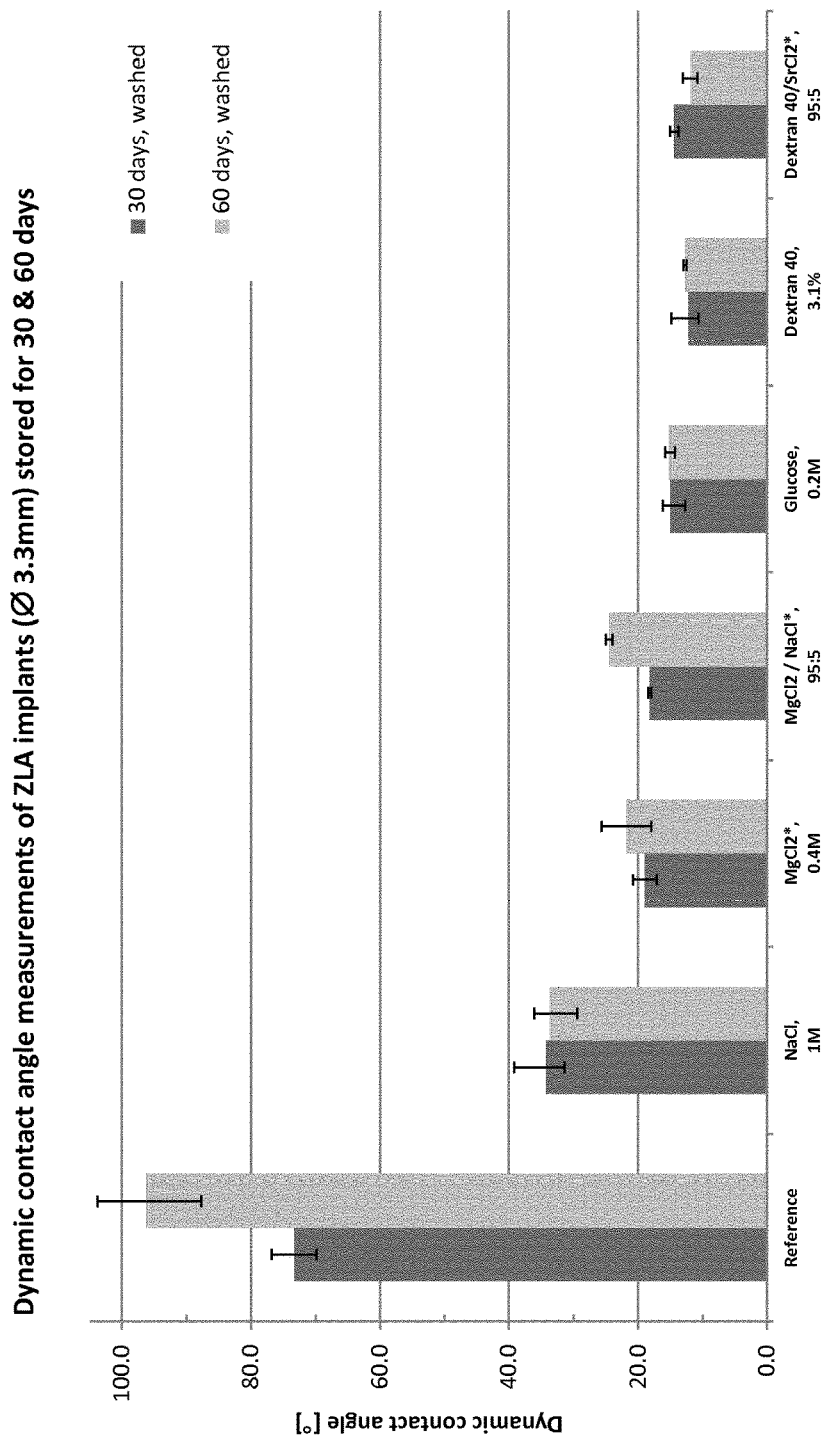
Figure 8: Dynamic contact angle (advancing contact angle) measurements of coated ZLA implants stored for 30 and 60 days and washed with ultrapure water before measurement

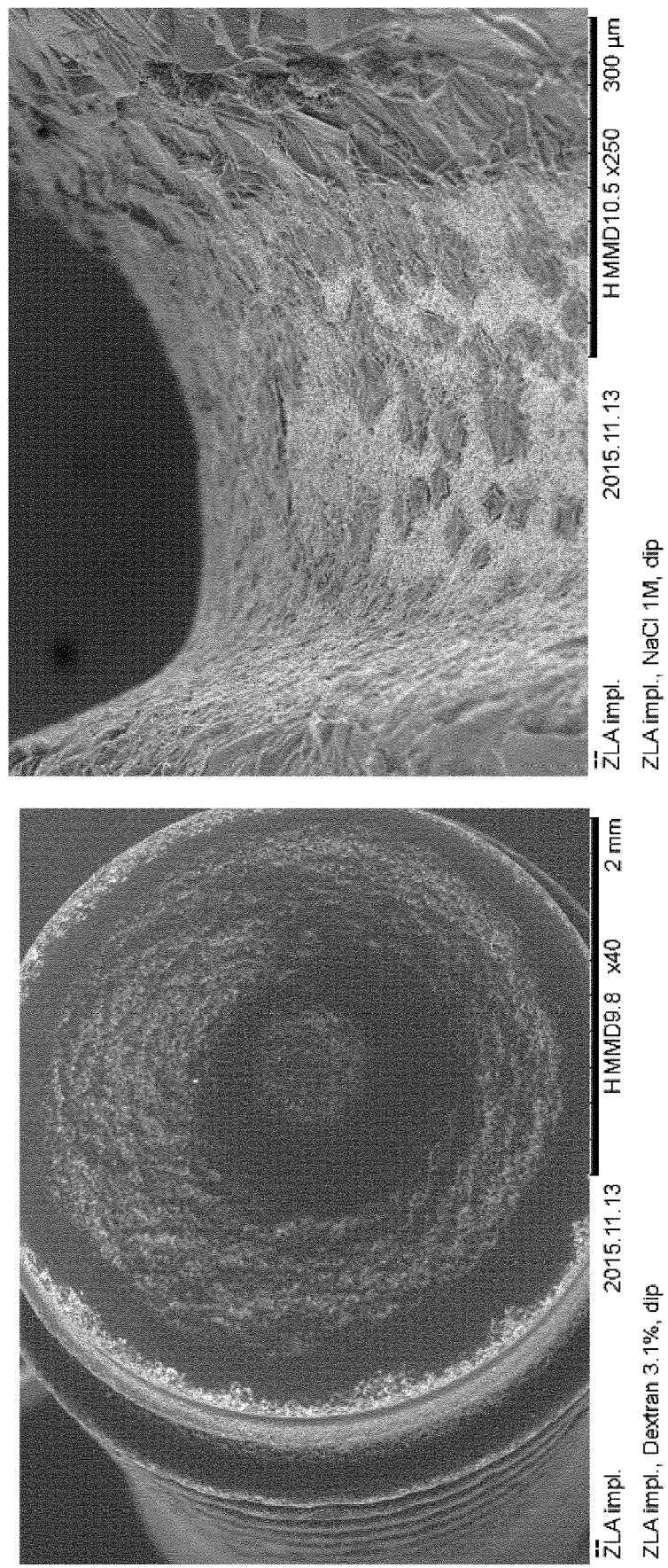
Figure 9: SEM pictures of ZLA implants coated with dextran (left) and NaCl (right)

DENTAL IMPLANT

TECHNICAL FIELD

The present invention relates to a dental implant being at least partially covered by a protective layer.

BACKGROUND

Dental implants are used to replace individual teeth or for anchoring more complex structures, which generally replace several or even all teeth. Implants have two essential parts: an anchoring part and an abutment part.

The anchoring part is embedded in the bone, where it osseointegrates with the bone tissue to provide a firm anchor for the prosthesis. The abutment extends into the oral cavity and provides a support for the prosthesis. The desired prosthetic element (e.g. bridge or crown) is fastened over the abutment such that at least part of the abutment is housed within the prosthesis and provides core support to this. The prosthetic element can be adhesively bonded, cemented, screwed or directly veneered onto the abutment.

Implants, such as dental implants, are well known in the art. They generally consist of a material, which is biocompatible and which additionally has favorable mechanical properties.

In addition, it is required that the dental implant provides good osseointegration. The term "osseointegration" designates the direct structural and functional connection between living bone and the surface of the load-bearing implant. A good osseointegration means that the implant, after reaching a primary stability by screwing it into the bone, safely ossifies within a short healing time so that a permanent bond between implant and bone is obtained.

In the beginning phase of modern implantology a minimally rough surface was the gold standard. Later, an increase to moderately rough surfaces led to faster and firmer osseointegration in several experimental studies using various animal models.

A breakthrough technology in the development of highly osseointegrative dental implants is the so-called "SLA" process which is disclosed in EP 0 388 576, involving sandblasting the implant's surface followed by acid-etching to achieve an optimal topography for the attachment of bone cells.

Based on the "SLA" technology, the so-called "SLActive" surface was developed and disclosed in WO 00/44305, which further comprises conditioning the "SLA" surface either in nitrogen or in an isotonic saline solution, thereby maintaining the high hydrophilicity of the "SLA" surface which would otherwise be lost due to reaction with the atmosphere. The packaging process is time-consuming and expensive, which is a disadvantage of this procedure.

US 2014/172028 discloses a surface treatment process of an endosseous implantable medical device by covering the surface of the medical implant with a sugar or a sugar alcohol.

WO 2008/098976 discloses a process for the production of implants with a hydrophilic surface by covering the surface of said implant with a salty layer.

US 2009/0132048 discloses a dental implant which is at least partly provided with a protective layer which dissolves on contact with body fluid and/or the bone, said protective layer consisting of salt. However, salty protective layers, in particular those consisting of NaCl, show a reduced long-term stability.

WO 03/030957 discloses an implant having roughened hydroxylated and hydrophilic surface and being treated in the hydroxylated state with high-energy ultraviolet radiation. One disadvantage of this solution is the additional treatment step which is supposed to be carried out by the surgeon in particular.

EP 2 992 908 discloses a method for treating a surface of an implant made of titanium or a titanium alloy including coating a surface treatment composition containing an organic material having a hydrophilic group on the surface of the implant. The organic material includes at least one selected from the group consisting of saccharides, proteins, acids and biological buffer or good's buffer.

Many possible saccharides, in particular glucose, are mentioned. However, many of them are not water-soluble such as cellulose and can therefore not be applied on a hydrophilic surface without destroying a hydrophilic surface of the implant.

US 2011/0053113 discloses a dental implant made of titanium or a titanium alloy which has a coating. The coating comprises a simvastatin salt. Statins such as simvastatin can promote the formulation of bone in vitro and in vivo. As matrix material, a water-soluble ionic polymeric component, in particular an amino-containing derivative of natural polysaccharides, is used.

Park et al, Biomaterials 33 (2012), 5267-5277 disclose the use of polyelectrolyte films to modulate osteoblast response to microstructured titanium surfaces. Said films comprise chitosan poly(L-lysine) or poly(L-glutamic acid).

WO 2012/175220 relates to a dental implant made of a ceramic material, wherein the surface region of the dental implant is enriched with a magnesium component thereby forming a hydrophilic surface area.

SUMMARY

The object of the present invention is to provide an implant which has excellent osseointegration properties after storage.

The problem is solved by the dental implant according to claim 1. Further preferred embodiments are subjects of the dependent claims.

Surprisingly, it was found that the dental implant according to the present invention has an excellent stock stability. After removal of the protective layer, it has still a hydrophilic surface. That is, even though large organic polymers are involved, the hydrophilic surface is maintained and not negatively influenced. This finding was very surprising since a water-soluble dextran having a molecular weight of more than 15'000 Dalton have a much lower hydrophilicity than small organic molecules such as fructose or glucose.

The protective layer prevents the deposition of contaminants, in particular of organic compounds, on the implant surface having at least partly a contact angle of less than 20°. In addition, the contact angle on the surface of the protective layer is less than 40°, that is, even the protective layer itself has a good wettability. The maintenance of the high hydrophilicity of the surface of the dental implant ensures an excellent wettability inducing an accelerated osseointegration. In particular, it could be shown that the protective layer according to the present invention can withstand harsh conditions such as high humidity, low temperature or low pressure. The protective layer of the dental implant according to the present invention allows to maintain the hydrophilicity of the surface during the storage time in the air.

Depending on the surgeon, the protective layer remains on the implant during the implantation and is dissolved or eliminated by the human body within a short time period or the protective layer is removed immediately before the implantation by washing with water.

The first option has the advantage, that no further chairside treatment is necessary. However, due to the fast elimination of the protective layer within the body, the wettability of the implant will be essentially the same as if the protective layer is removed before the implantation.

The dental implant according to the present invention is made of a ceramic material and comprises an implant surface having at least partially a contact angle of less than 20°, said implant surface being at least partially covered by a protective layer. Said protective layer comprises a water-soluble dextran having a molecular weight of more than 15'000 Da.

Water-soluble dextran within the context of the present invention means that the solubility of the dextran in water at 25° C. is more than 10 g/liter (that is 1% weight to volume), preferably more than 25 g/liter (that is, 2.5% weight to volume), and most preferably more than 30 g/liter (that is, 3% weight to volume). The water solubility of dextran is essential since dextran has to be solubilized in water in order to prepare the protective layer. An organic solvent such as ethanol immediately would destroy the hydrophilicity of the surface to be protected. The water solubility ensures a fast resorption of the protective layer after a short period of time exposing the hydrophilic surface of the dental implant to the bone tissue. This allows a direct structural and functional connection between the living bone and the dental implant which is a prerequisite of good osseointegration. In addition, the small amount of the water-soluble dextran is absorbed in the body without any negative side effects.

The standard parameter to determine the hydrophilicity of a surface is the measurement of the water contact angle (DIN 55660-2). The contact angle quantifies the wettability of the implant by water and therefore the degree of contact with the hydrophilic surroundings. The term "contact angle" as used in the context of the present invention relates to the contact angle of water on the surface, i.e. to the angle formed at the interface where water meets the surface. Thereby, the term "water" used in the context of the contact angle measurement relates to pure water, specifically ultrapure water. In particular, the contact angle measurement is carried out by the sessile drop method (e.g. by means of a device of the type EasyDrop DSA20E, Kruss GmbH) using a drop size of 0.3 µl. Contact angles were calculated by fitting a circular segment function to the contour of the droplet placed on the surface.

The term "hydrophilic" or "hydrophilicity" as used in the context of the present invention refers to a water contact angle of the hydrophilic surface area directly on the dental implant being less than 20°, more preferably less than 10°. For a contact angle of less than 10°, the term "superhydrophilic" is used.

Such a hydrophilic surface having a contact angle of less than 20° can be obtained for example by the so-called SLA technology or by other etching procedures. Contact angles are determined after rinsing (washing) the implants (or the samples) with ultrapure water for about 15 seconds followed by blow drying in a stream of Argon, in order to remove the protective coating.

Preferred procedures are disclosed below. Preferably, the entire implant surface region which is to come into contact with the bone tissue in the implanted state has a hydrophilic surface, that is a surface having a contact angle of less than 20°. However, also the surface region which is to come into contact with the soft tissue may have a hydrophilic surface having a contact angle of less than 20°. Alternatively, the surface region which is to come into contact with the soft tissue may be untreated or may have a hydrophilic surface having a contact angle of less than 45°. In particular, if said surface region has a smooth, not roughened surface, a contact angle of less than 450 may be sufficient for a good wettability as well. The dental implant according to the present invention can be constructed in one or more parts, in which case they consist of at least an anchoring part, often referred to in isolation as the implant, and an abutment, sometimes referred to as a spacer or post element. The anchoring part is usually either embedded completely in the bone, that is to say to the height of the alveolar crest (so called bone level implants), or protrudes by a few millimetres from the alveolar crest into the soft tissue (so called soft tissue level implants). The abutment is mounted either directly or indirectly to the anchoring part after the latter has become incorporated (osseointegrated) into the bone, or directly after the anchoring part has been inserted. It can also be attached to the anchoring part prior to insertion.

Preferably, such an anchoring part of a multi-part dental implant is generally in a cylindrical or conical shape, having an apical end with a body portion and a coronal end with a neck portion intended to receive an abutment in case of multi-part implants, and a transition portion being arranged in axial direction between the body portion and the neck portion. On said abutment a crown, a bridge or another suprastructure may be fixed, for example by screwing, cementing or gluing. The body portion is intended to be directed against the bone tissue in the implanted state and the neck portion is intended to direct against the soft tissue, whereas the transition portion may direct against the bone tissue or the soft tissue depending on the patient.

Preferably, the total length of the anchoring part is 4 to 19 mm in the axial direction. The body portion with the apical end is preferably 50 to 90% of the total length of the implant in axial direction. The neck portion with the coronal end which is essentially be intended to be in contact with the soft tissue covers preferably 10 to 40% of the total length of the implant in axial direction. The transition portion covers preferably 0 to 40% of the total length of the implant in axial direction. The neck portion has preferably a length of 1 to 4 mm, most preferably 1.8 to 2.8 mm, the transition portion has preferably a length of 0 to 2 mm, most preferably 1 to 2 mm, and the body portion has preferably a length of 4 to 18 mm.

The body portion typically includes a threaded part which may by self-tapping or non-self-tapping. In order to obtain an excellent osseointegration, the body portion is typically provided with a surface roughness. The term "surface roughness" within the context of the present invention stands for "arithmetical mean height" ($S_a$). Details with regard to the determination of the surface roughness are disclosed below. Preferably, the surface roughness $S_a$ of the body portion in the range from 0.1 µm to 2.0 µm, preferably being in a range from 0.4 µm to 1.8 µm.

The transition portion may be provided with the same surface roughness $S_a$ as the body portion. However, it may have a slightly lower surface roughness $S_a$ than the body portion, preferably in the range from 0.05 µm to 1.5 µm, most preferably 0.1 µm to 1.0 µm. Such a transition portion is sufficiently rough to minimize the danger of bone resorption.

The neck portion typically includes an unthreaded part, which is in coronal direction outwardly tapering or is substantially straight and ends in a shoulder portion which may have an inwardly-tapering surface. The neck part may be smooth, that is machined, or it may be provided with a surface roughness $S_a$. However, preferably the surface roughness $S_a$ of the neck portion is less than the surface roughness $S_a$ of the body portion. Preferably the surface roughness $S_a$ of the neck portion is in the range of 0.01 μm to 1.0 μm, most preferably in the range of 0.05 μm to 0.5 μm, since this positively influences the osseointegration of the implant, while minimizing the adherence of dental plaque that can cause an adverse mucosal tissue reaction and result in a loss of crestal bone.

Roughness images were acquired using a confocal microscope (μsurf explorer, NanoFocus AG, Oberhausen, Germany) equipped with a 20× lens.

The roughness parameters were calculated using the WinSAM software. The whole roughness image with a size of 798 μm (micrometer)×798 μm (micrometer), later resolution 1.56 μm (micrometer), piezoelectric scanner, step size 0.07 μm (micrometer) was used for the calculation of the 3D roughness parameters (working distance 3.1 mm, n.a. 0.45).

The values of the microscopic topographical formation (roughness) were determined using a moving average Gaussian filter with a cut-off wavelength of 30 μm (x=31 μm, y=30 μm, 20×19 image points). Then, the roughness values were calculated by means of a KFL analysis with limits from the amplitude density, step size 10 nm.

Specifically, the surface roughness $S_a$ (the arithmetic mean deviation of the surface in three dimensions) was determined in analogy to EN ISO 4287 relating to the respective parameters $R_a$ in two dimensions. For the parameters in three dimensions, it is further referred to ISO 25178 (Sa is defined as Sq).

In case of a bone level implant, the anchoring part consists of the body portion and has no neck portion, since the whole implant is intended to be directed against the bone tissue.

The surface of the body portion has at least partially a contact angle of less than 20°. Preferably, the entire surface of the body portion has a contact angle of less than 20°. Said surface is at least partially, preferably essentially entirely covered with the protective layer according to the present invention. The expression "essentially entirely" means within the context of the present invention at least 95% of the surface of the body portion having a contact angle of less than 20° is covered by the protective layer.

In a further embodiment of the present invention not only the body portion but also the transition portion of the anchoring part is hydrophilic. Preferably the transition portion has a contact angle of less than 45°, preferably of less than 20°, which is covered by the protective layer. Preferably, at least 25%, most preferably at least 50% of the apical circumferential surface area of the transition portion is covered with said protective layer. This allows more flexibility when implanting the implant and ensures that the whole surface, which is intended to be in contact with the bone tissue, is hydrophilic.

Alternatively, except for the shoulder portion, that is the inwardly-tapering surface of the neck portion, the entire surface of anchoring part, including body portion, transition portion and neck portion, is hydrophilic, since it could be shown that a hydrophilic surface leads to the formation of new connective tissue adjacent to the soft tissue contact surface of the implant and the new connective tissue tends to be in close contact with said surface. The contact angle of the neck part and the transition part may be higher than the contact angle of the body part. The contact angle of the neck part and of the transition part may be for example less than 45° and the contact angle of the body part may be less than 20°. Most preferably, except for the shoulder portion, the entire surface of the anchoring part has a contact angle of less than 20° which is completely covered with the protective layer according to the present invention.

Alternatively, the dental implant according to the present invention can be constructed in one part, such that the anchoring part and the abutment part are produced as one integral monolithic piece. Hence in such implant systems, the integrated anchoring part and the abutment are always positioned within the mouth at the same time and the single piece implant, which is also called monotype implant, extends through the soft tissue into the oral cavity to form a core support for the prosthesis. Such monotype implants do not require a separate, secondary part.

Similar to the multi-part implant system the anchoring portion of such a monotype implant is generally in a cylindrical or conical shape, having an apical end with a body portion and a coronal end with a neck portion passing into the abutment. The anchoring portion is typically provided with a threaded part, which may be self-tapping or non-self-tapping. A transition portion is arranged in axial direction between the body portion and the neck portion. On the abutment portion a crown, a bridge or another suprastructure may be fixed, for example by screwing, cementing or gluing. The body portion is intended to be directed against the bone tissue in the implanted state and the neck portion is intended to direct against the soft tissue, whereas the transition portion may direct against the bone tissue or the soft tissue depending on the patient.

The surface of said body portion of the monotype implant has at least partially a contact angle of less than 20°. Preferably, the entire surface of the body portion has a contact angle of less than 20°. Said surface is at least partially, preferably entirely covered with the protective layer according to the present invention. Further, as for the multi-part implant systems also the surface transition portion and/or the surface of the neck portion have contact angle of less than 45°, preferably of less than 20°, which is covered by the protective layer. Preferably, at least 25%, most preferably at least 50% of the apical circumferential surface area of the transition portion is covered with said protective layer.

However, preferably the abutment portion of such a monotype dental implant is free of a protective layer, since this could negatively impair the fixation of the suprastructure.

A protective coating is not generally necessary for abutments, crowns, bridges or other prosthetic constructions.

The protective layer covering at least partly, preferably fully the hydrophilic surface of the dental implant according to the present invention is preferably a continuous, crackless layer. In particular, if not only the body portion, but also the transition portion or the transition portion and the neck portion are covered with the protective layer, said protective layer is preferably one continuous layer.

The dextran comprised in the protective layer is a water-soluble nonionic dextran. Charged dextran derivatives such as diethylaminoethyl cellulose dextran or carboxymethyl-dextran are not encompassed by the term "nonionic dextran".

It could be shown that a nonionic dextran can protect the hydrophilic surface of the dental implant. Very good effects could be obtained with a dextran having a molecular weight of 35'000 to 50'000 Da. With dextran having a molecular weight of 35'000 to 50'000 Da, preferably of about 40'000 Da, essentially closed and stable layers could be formed. The absence of cracks, that is essentially closed and stable layers, is very important since this ensures that no small organic particles can come in contact with the implant surface having a contact angle of less than 20° and therefore allows to maintain the hydrophilicity of said surface.

The protective layer is preferably free of other organic molecules, and in particular free of water-insoluble organic molecules in order to avoid the presence of ethanol in the preparation process.

Preferably, the protective layer additionally comprises at least one salt or a mixture of different salts. It was found that the combination of a water-soluble dextran having a molecular weight of more than 15'000 Da and a salt results in a closed and stable protective layer. In contrast thereto, protective layers consisting exclusively of NaCl or KCl form cracks and pattern after drying, which is of course less preferred, in particular with regard to the long-term stability.

Especially good results could be obtained by the combination of a water-soluble dextran having a molecular weight of more than 15'000 Da and a divalent salt. Without being bound by theory, it is believed that remaining crystal water of the divalent salts could help to form a close, crackless protective layer.

Preferably, the salt is selected from the group consisting of NaCl, KCl, $MgCl_2$, $CaCl_2$, $SrCl_2$, $KH_2PO_4$ and $Na_2SO_4$ or a mixture thereof, most preferably of $MgCl_2$ and $SrCl_2$, and in particular of $SrCl_2$. Best results could be obtained by a combination of dextran having a molecular weight of 35'000 to 50'000 Da and $MgCl_2$ or $SrCl_2$, and in particular in combination with $SrCl_2$. Said combinations result in protective layers having an outstanding long-term stability.

The protective layer has typically a thickness in the range of 0.1 to 20 μm, preferably 0.2 to 5 μm, including 1, 1.5, 2, 2.5, 3, 3.5, 4 and 4.5 μm. In principle, it is sufficient for the layer to cover the hydrophilic surface of the dental implant so that no deposits form thereon.

Even a protective layer which is just a few layers of atoms in thickness stops organic compounds depositing directly on the hydrophilic surface. Although the organic compounds are then able to deposit on the protective layer, the surface remains altogether hydrophilic and biologically active.

The speed with which the protective coating dissolved in the body can be controlled by the choice of the thickness of the layer and the water solubility of the protective coating. In particular, the dissolution of a protective layer having a thickness of 0.2 to 5 μm is very fast, allowing an almost immediate contact, that is within a few seconds, of the hydrophilic surface of the implant with the blood.

Preferably, in the protective layer, the molar ratio of dextran to salt is between 1:1 and 1:10, preferably between 1:1 and 1:5 and most preferably between 1:1 and 1:2. It has to be noted that due to the high molecular weight of dextran in comparison with a salt, the weights of dextran dominate in such a protective layer, even if the molar ratio of dextran to salt is 1:10.

In one embodiment of the present invention, the dental implant made of a ceramic material is made of zirconia, preferably of a yttria stabilized zirconia. Most preferably the yttria stabilized zirconia comprises further stabilizators. The composition of the partially stabilized zirconia complies with the requirement that the total amount of $ZrO_2$, $Y_2O_3$ and $HfO_2$ is more than 99.0 weight-%, with the amount of $Y_2O_3$ being from 4.5 to 5.4 weight-%, with the amount of $Al_2O_3$ being less than 0.5 weight-% and the amount of $HfO_2$ being less than 5.0 weight-%. Even more preferably the dental implant is made of a mixture of 92.1%-93.5% by weight ZrO2%, 4.5%-5.5% by weight $Y_2O_3$, and 1.8%-2.2% by weight of $HfO_2$. In a particularly preferred embodiment, the ceramic implant is made of yttria stabilized zirconia according to ISO 13356.

An example of a preferred yttria-stabilized zirconia is Tosoh zirconia powder of grade TZ-3YSB-E (Tosoh Corporation) comprising 4.95 to 5.35 weight-% of $Y_2O_3$, 0.15 to 0.35 weight-% $Al_2O_3$, at most 0.02 weight-% $SiO_2$, at most 0.01 weight-% $Fe_2O_3$, at most 0.02 weight-% $SiO_2$, at most 0.01 weight-% $Fe_2O_3$, at most 0.04 weight-% $Na_2O$ and comprising a binder in an amount corresponding to an lg-loss of 2.7 to 3.9 weight-%, the percentages being based on the total weight of the zirconia powder.

Such ceramic materials show no interaction with other dental material. In addition, they have a light colour and can thus be closely adapted to natural tooth colour. Also, such a ceramic implant is highly resistant, biocompatible and can be worked into the desired shape for a dental implant or abutment.

Preferably, the dental implant according to the present invention has a storage stability of more than 4 months, preferably 6 months, most preferably 24 months. Such a high storage stability can be reached in particular with a protective layer comprising dextran and a divalent salt.

A further aspect of the invention provides a package comprising the implant according to the present invention. The implant is kept within the package. The protective layer works as a preserving layer for preventing deposits on the surface of the implant. Therefore, there is no need to make the package gas- and/or liquid tight and, in contrast to the state of the art, to provide an inert atmosphere in the package. In consequence, the manufacturing process is less costly and more convenient.

Preferably, the dental implant is sterilized by ethylene oxide gas. This technique can be applied on the dental implant that is packed already. The ethylene oxide gas permeates the packaging and reaches the dental article to be sterilized. It could be shown that a sterilization by ethylene oxide gas does not negatively influence the stability of the protective layer. The hydrophilicity of the surface remains stable, which is particularly relevant when the dental implant is stored over relative long periods.

The present invention also relates to a package comprising a sterilized dental implant according to the present invention. Preferably, the sterilization is carried out by ethylene oxide gas.

A further aspect of the present invention provides a process for treating a dental implant made of a ceramic material as follows:

a) treating at least partially the surface of a dental implant to obtain a contact angle of less than 20°, b) covering at least partially the surface of the implant having a contact angle of less than 20° with an aqueous solution comprising at least water-soluble dextran having a molecular weight of more than 15'000 Da, c) drying said surface by removing at least partly the water to obtain a protective layer.

To obtain a hydrophilicity of less than 20°, preferably of less than 10°, at least part of the dental implant may be treated according to the process described for example in EP 0 388 576 leading to an SLA® surface topography.

The expression "removing at least partly the water" within the context of the present invention stands for removing the water to such an extent that a solid, stable layer is formed. However, crystal water, in particular, if divalent salts are present, may remain in the protective layer.

In particular, the dental implant is preferably prepared by a process comprising the steps of 1) providing an implant made of a ceramic material,
2) roughening at least a part of the surface of the implant mechanically and/or by using plasma technology and/or by laser structuring or by other methods known to the skilled person,
3) etching the roughened surface with an acid,
4) optionally plasma cleaning of the dental implant.

Preferably, the roughening of step 2) is carried out by shot-blasting and/or sand-blasting.

The etching of step 3) is preferably carried out by an inorganic acid or a blend of inorganic acids. More preferably, the inorganic acid(s) is/are selected from the group consisting of hydrofluoric acid, hydrochloric acid, sulphuric acid or mixtures thereof.

If the implant is made of zirconia, a preferred surface topography can be obtained for example by applying the process described in EP 1 982 670 or EP 1 982 671 before coating the roughened and etched surface. The disclosure of EP 1 982 670 and EP 1 982 671 is incorporated herein by reference.

Preferably, the dental implant according to the present invention is prepared by a process comprising the steps of
1) providing an implant made of ceramic, preferably made of yttria stabilized zirconia,
2) roughening at least a part of the surface of the implant mechanically and/or by using plasma technology and/or by laser structuring,
3) etching the roughened surface with an acid,
4) optionally plasma cleaning of the dental implant.

Preferably, the roughening of step 2) is carried out by shot-blasting and/or sand-blasting. Such procedures are known to those skilled in the art.

With regard to the sandblasting different known methods may be used, for example injection blasting or pressure blasting. The parameter used depend on the method are known to the skilled person. A considerably improved macroscopic roughness is achieved when using a hard material, such as boron carbide. In a further preferred embodiment, $Al_2O_3$ particles having an average diameter of 0.1-0.6 mm, 0.15-0.5 mm, 0.2-0.4 mm in case of metal implants and 0.05-0.5 mm, 0.1-0.4 mm, 0.12-0.36 mm in case of ceramic implants.

As an alternative to sandblasting, the macroscopic roughness can also be provided by injection molding techniques. Injection molding techniques are known to a skilled person and are described, for example, in US 2004/0029075, the content of which is incorporated herein by reference. According to these techniques, casting molds with cavities are used, said cavities corresponding to the peaks of the macroscopic roughness of the molded implant. The cavities of the casting mold are slightly greater in proportion than the peaks to be provided, taking into account the shrinking of the ceramic after injection molding. The casting molds themselves may be treated by sand blasting, anodization, laser and/or by erosion techniques in order to produce the cavities or the structured surface on the inner surface of the molds.

Injection molding techniques have the advantage that they allow a speedy and cheap production of the dental implants. Furthermore, the manufacture of the dental implant by injection molding circumvents the additional step of providing the macroscopic roughness, and is thus quick. In addition, it has an excellent reproducibility and there is no contamination with particles from sandblasting.

In case the hydrophilic surface of the dental implants is not directly covered with the protective layer according to the present invention, it is preferred to treat the surface by $O_2$ plasma cleaning immediately prior coating with the protective coating. It could be shown, that the hydrophilicity of the surface could be reconstituted the hydrophilicity fast and effective.

The etching of step 3) is preferably carried out by an etching solution comprising at least 50% by volume, more preferably at least 80% by volume of concentrated hydrofluoric acid. Etching with this etching solution leads after a relatively short etching time to a uniform topography over the whole surface treated. The etching solution can further comprise at least one compound selected from the group consisting of phosphoric acid, nitric acid, ammonium fluoride, sulfuric acid, hydrogen peroxide, hydrofluoric acid and bromic acid. Preferably, the etching solution comprises sulfuric acid in an amount of 50 by volume at most or concentrated hydrofluoric acid. The etching time depends highly on the etching solution used and typically ranges from about 10 seconds to about 120 minutes. The etching time is preferably 1 minute to 60 minutes, more preferably 1 minute to about 20 minutes and most preferably about 10 minutes.

Preferably, at least part or the entire surface having a contact angle of less than 20° is then covered by the protective layer. This can be done for example by dipping the implant after step a) into an aqueous solution comprising the water-soluble dextran having a molecular weight of more than 15'000 Da and further optional ingredients. However, other methods to apply the aqueous solution to the surface to be protected are possible as well, but if dextran is applied as a solution, it has to be dissolved in water since organic solvents, such as ethanol, destroy the hydrophilicity of the implant surface to be protected.

Preferably, the drying in step c) is carried out by microwave treatment or by drying in a convection oven, a vacuum oven or in an airstream, said airstream preferably having a temperature of 20° C. to 50° C., most preferably of 30° C. to 40° C. Preferably, the implants according to the present invention are dried in the convection oven at 50 to 80° C., preferably at 70° C., for 10 to 120 minutes, preferably for 15 to 90 minutes, most preferably for 20 to 60 minutes, ensuring that the protective layer is dried out completely. If salts are present, the crystal water may remain in the protective layer. The above drying method does not induce splatters of the coating substance on the sample and ensures a constant thickness of the protective coating.

Preferably, dextran is solubilized in an aqueous solution comprising at least the water-soluble dextran having a molecular weight of more than 15'000 Da in a concentration of 1 to 10% by weight to volume (w/v), preferably 2.5 to 5% by weight to volume (w/v), most preferably 3 to 4% by weight to volume (w/v).

BRIEF DESCRIPTION OF THE FIGURES

The present invention is further illustrated by the following figures and examples:

FIG. 1 refers to a first embodiment of the present invention;
FIG. 2 refers to a second embodiment of the present invention;
FIG. 3 refers to a third embodiment of the present invention;
FIG. 4 refers to a forth embodiment of the present invention;
FIG. 5 refers to a fifth embodiment of the present invention;

FIG. 6 refers to a sample coated with NaCl 1M (left), KCl 1M (right);

FIG. 7 refers to static contact angle measurements of ZLA discs stored for 30, 60 and 166 days and washed with ultrapure water before measurement;

FIG. 8 refers to dynamic contact angle (measurements of coated ZLA implants stored for 30 and 60 days and washed with ultrapure water before measurement;

FIG. 9 refers to SEM pictures of ZLA implants coated with dextran (left) and NaCl (right).

DETAILED DESCRIPTION

FIG. 1 shows an anchoring part 1 of a two-part implant system. Such an anchoring part 1 is made of a ceramic material, preferably of a yttria stabilized zirconia. Said anchoring part 1 is in a cylindrical shape, having an apical end 25 with a body portion 20 and a coronal end 35 with a neck portion 30 intended to receive an abutment, and a transition portion 40 being arranged in axial direction A between the body portion 20 and the neck portion 30. The neck portion 30 includes an unthreaded part 31 which is in coronal direction outwardly tapering and ends in a shoulder portion 32 with an inwardly-tapering surface. The body portion 20 is intended to be directed against the bone tissue in the implanted state, whereas the neck portion 30 is intended to be directed against the soft tissue in the implanted state. The transition portion 40 may be directed towards the soft tissue and the bone tissue depending on the depth to which the implant is screwed or on the tissue reaction. The surface of the body portion 20 has a contact angle of less than 20°, which is preferably entirely covered with the protective layer 10.

FIG. 2 shows another embodiment of the present invention. In contrast to the embodiment of FIG. 1, not only the body portion 20 but also the transition portion 40 of the anchoring part is at least partly, preferably entirely coated with said protective layer 10. Preferably, in apical direction, at least 25%, most preferably at least 50% of the circumferential surface area of the transition portion is covered with the protective layer 10. Preferably, also at least a part preferably the entire surface of the transition portion has a contact angle of less than 20°, before covering it with the protective coating 10. However, it is also possible, that only the surface of the body portion of the dental implant has a contact angle of less than 20°, but the protective layer covers both, body portion and transition portion. This allows to ensure that also the hydrophilic surface of the edges is fully protected by the protective layer.

FIG. 3 shows another embodiment of the present invention. In contrast to the embodiment of FIG. 1, not only the body portion 20 but also the transition portion 40 and the neck portion 30 except for the shoulder portion 32 are completely coated with the protective layer 10. Also at least a part, preferably the entire surface of the transition portion and at least a part of the neck portion has a contact angle of less than 20°, before covering it with the protective layer 10. It could be shown, that a hydrophilic surface not only ensures a good osseointegration but also positively influences the adherence to the soft tissue. However, it is also possible, that only the surface of the body portion of the dental implant and optionally part of the transition portion has a contact angle of less than 20°, but the protective layer covers both, body portion and transition portion.

FIG. 4 shows an anchoring part 101 of a so-called bone level implant. Such a bone level implant is usually embedded completely in the bone, that is to say to the height of the alveolar crest. Said anchoring part 101 is made of a ceramic material, preferably of a yttria stabilized zirconia. The anchoring part 101 is in a cylindrical shape, having an apical end 125 with a body portion 120 and a coronal end 135 intended to receive an abutment. In contrast to the dental implant shown in FIG. 1, the anchoring part of a bone level implant has no neck portion. The body portion 120 is intended to be entirely directed against the bone tissue in the implanted state. The surface of the body portion 120 has a contact angle of less than 20°, which is entirely covered with the protective layer 140.

FIG. 5 shows a monotype dental implant 200. Said monotype dental implant 200 is made of a ceramic material, preferably of a yttria stabilized zirconia. It comprises an anchoring part 205 having a threaded section 210. The anchoring part 205 at its upper end 215 transitions via a slightly enlarged conical neck portion 220 to the outside into a mounting part 225 being integral therewith and extending within an extension of the longitudinal axis 230 of the threaded section. Said anchoring part 205 is in a cylindrical shape, having an apical end 235 with a body portion 240 and a coronal end 245 with a neck portion 220, and a transition portion 250 being arranged in axial direction A between the body portion 240 and the neck portion 220.

The mounting part 220 has a frusto-conical or a conical shape and may be provided with at least one a flattening 230 at one side thereof.

At the side opposite the at least one flattening 260 there may be a groove 265 within the outer surface that extends from the coronal front surface of the mounting part 225 toward the apical side and ends in a conical section which forms the transition to the conical section of the anchoring part 205. The flattening 260 in combination with the groove 265 located on the opposite side functions to provide a positive a screwing tool which has a plug-in seat matched thereto. Alternatively, the mounting part may be provided with other means for receiving a screwing tool.

The body portion 240 is intended to be directed against the bone tissue in the implanted state and the neck portion 220 is intended to direct against the soft tissue, whereas the transition portion 250 may direct against the bone tissue or the soft tissue depending on the patient. The surface of the body portion 240 has a contact angle of less than 20°, which is at least partly, preferably entirely covered with the protective layer 270. Optionally, not only the body portion 240 but also the transition portion 250 of the anchoring part is hydrophilic. Preferably, the transition portion 250 has a contact angle of less than 45°, preferably of less than 20°, which is covered by the protective layer 270. Preferably, at least 25%, most preferably at least 50% of the apical circumferential surface area of the transition portion is covered with said protective layer 250. This allows more flexibility when implanting the implant and ensures that the whole surface, which is intended to be in contact with the bone tissue, is hydrophilic.

EXAMPLES

1. Methods 1.1. Cleaning and coating: Experimental procedures

Samples used for coating experiments were cleaned and stored as follows:

i. $O_2$ plasma cleaning of clean discs: Pressure vacuum chamber $1*10^{-1}$ mbar; power: 35 W; countdown timer: 2 min; oxygen gas flow: 5 sccm, cleaning steps: 2.

ii. Coating: The sample was dipped in the solution for 30 seconds, placed on a Teflon mesh and dried. The drying was carried out by
  a. let drying for at least 20 h in air,
  b. in a convection oven (for example Heraeus; serial no. 95104542, type) or
  c. in a vacuum oven (for example Salvis Typ. KVTS 11).
iii. Storage: The samples were stored in a 24-well plate and placed in a closed laminar flow box without ventilation. The contact angle measurements were performed after 1 week of storage.

1.2. Static Contact Angle Measurements, Sessile Drop Method

Contact angle measurements were performed in order to determine the degree of hydrophilicity or hydrophobicity. Usually, the contact angles of plates and discs were determined by static contact angle measurements. The static contact angles were determined using a sessile drop test with ultrapure water (EasyDrop DSA20E, Kruss GmbH). The water droplets with a size of 0.3 μl were dosed using an automated unit. Values for contact angles were calculated by fitting a circular segment function to the contour of the droplet placed on the surface. Contact angles were determined after rinsing (washing) the samples with ultrapure water for about 15 seconds followed by blow drying in a stream of Ar in order to remove the coating. Contact angles were measured after different storage periods in air. Samples were stored for up to 166 days.

1.3. Dynamic Contact Angle Measurement

Usually, the contact angles implants were determined by static contact angle measurements. Dynamic contact angles (DCA) of implants were determined by the Wilhelmy method by means of a tensiometer (Lauda TE 3, Lauda Dr. R. Wobser GmbH & Co. KG). The advancing contact angle is presented in all cases, and was determined by immersion of the implant into ultrapure water.

1.4. Surface Analysis Using SEM and EDS

Scanning electron microscopy (SEM) and electron dispersive x-ray spectroscopy (EDS) were used for the analysis of the coated samples. The surface topography of the samples was scanned in detail with the SEM and the chemical composition of the surface of the samples was analysed with the EDS. All analyses were done with the table top SEM TM-3030Plus from Hitachi (SEM voltage: 5-15 kV, Detector: EDS-, back scattered and secondary electron detector, EDS-Analysis Bruker Quantax 70 EDS, Acquisition time 180 s, 15 kV).

1.5. Stress Test of Protective Layer

The stability of the coatings was assessed by exposing the sample to harsh conditions like high humidity, low temperature or low pressure. This stress test was carried out as follows:
  i) Relative humidity>95%, 15 minutes
  ii) Freezing at −19° C., 15 minutes
  iii) Drying at 40° C. in vacuum <0.1 mbar
The cycle was applied 3 times continuously.

Material

The term ZLA within the context of the present invention stands for yttria stabilized zirconia, i.e. 3Y-TZP according to DIN ISO 12677, having a sand blasted (corundum 0.1-0.4 mm, 6 bar) and acid etched surface (for example HF).

Example 1: Coating of Machined Ceramic Discs

The samples were cleaned as disclosed under Chapter 1.1. The experiments were performed on yttria stabilized zirconia discs (3Y-TZP, Ø 5 mm×1 mm) featuring a machined surface.

The samples were given into the respective coating solution and coated in the ultrasonic bath for 3 minutes.

The sample were in air for at least 20 h.

All samples were stored in a 24-well plate after coating and the static contact angle was measured after different storage times.

The contact angle was measured after rinsing the samples with ultrapure water and dried with argon gas.

TABLE 1

Contact angle results of coated, machined $ZrO_2$ discs after a storage period of 7 days in air (contact angles CA 1 and CA2 measured after one week).

| No. | Sample◆ | *CA 1 [°] | *CA 2 [°] | *mean [°] |
|---|---|---|---|---|
| Ref | Reference after $O_2$ plasma treatment | <10 | <10 | <10 |
| Ref | Reference | 80.4 | 84.2 | 82.3 |
| 1 | NaCl 1M | 73.6 | 70.0 | 71.8 |
| 2 | KCl 1M | 41.8 | 48.6 | 45.2 |
| 3 | $MgCl_2$ 0.5M | <10 | 13.2 | 13.2 |
| 4 | $CaCl_2$ 1M | 12.4 | 8.8 | 10.6 |
| 5 | $SrCl_2$ 1M | 32.7 | 21.2 | 27.0 |
| 6 | Dextran 3.1% | <10 | 5.5 | 5.5 |
| 7 | Dextran/$SrCl_2$ (3.1%, 1M) 95:5 | 4.8 | 4.8 | 4.8 |
| 8 | Dextran/$MgCl_2$ (3.1%, 0.5M) 5:95 | 4.5 | 4.6 | 4.6 |
| 9 | Dextran/$SrCl_2$/$MgCl_2$ (3.1%, 0.5M, 0.5M) 90:5:5 | 6.2 | 4.6 | 5.4 |

The contact angle results show that coatings with a monovalent salt, like NaCl, led to high contact angles after one week storage time. These salts did not coat the whole sample surface as it can be seen in FIG. 6: Sample coated with NaCl 1 M (left), KCl 1 M (right).

Other salts like $MgCl_2$ or $CaCl_2$ led to contact angles around 10°. In case of these salts a liquid layer remained on the surface and these samples were thus hygroscopic.

Dextran formed closed coating layers and the dextran coatings with or without mixtures with salts led to low contact angles.

Example 2: Long-Term Study

The long-term study was performed with ZLA discs (Ceramtec) and ZLA implants (Straumann, Villeret) where samples were stored in air for 30 and 60 days. Some of the ZLA discs were even stored for 166 days.

One batch was treated with the cyclic stress test (see Chapter 1.5.) after an initial storage period of 60 days and were stored for finally 166 days prior to analysis. Contact angle values below 5° could not be quantified because of experimental limitations (limitations in the determination of the proper contour of the droplet) and in the following, values below 5° will be stated as 5° and visualized with a red frame in the graphs.

The rinsing (washing) step with ultrapure water was performed in order to measure the bare surface.

Results can be seen in FIG. 7: Static contact angle measurements of ZLA discs stored for 30, 60 and 166 days and washed with ultrapure water before measurement.

Coatings with $CaCl_2$, $MgCl_2$, $MgCl_2$/NaCl, dextran or dextran/$SrCl_2$ prevented the surfaces from turning hydrophobic also after storage periods of 60 days as it could be shown with contact angles around 100 or lower. Contact angles of 14.2° and 18.7° were measured for ZLA discs coated with 1 M NaCl after storage in air for 30 and 60 days, respectively. The lowest contact angle could be measured for dextran and $MgCl_2$/NaCl coatings with values below 5° after 60 days.

For all samples, except for coatings containing dextran or the MgCl$_2$/NaCl coating, slightly higher contact angles were measured for washed samples after 166 days. For MgCl$_2$/NaCl and the dextran coatings, contact angles below 5° were measured. The biggest increase from 18.7° to 32.9° was measured for the NaCl coating. Only minor differences in contact angle were present for samples that underwent the stress cycle. No effect could be measured for dextran coated samples. In case of glucose coatings, the stress cycle lead to a rearrangement of the coating resulting in a new orientation of glucose crystals on the surface.

Example 3: Coating of ZLA-Implants

The implants were cleaned as disclosed under Chapter 1.1.

The implants were fixed on an own designed implant holder. The implants were then dipped into the coating solution until the whole ZLA area was immersed. The implants were coated in the ultrasonic bath for 3 minutes.

The holder with implants was placed in the convection oven (thread oriented to ground) at 70° C. for 30 minutes. The ventilation was reduced to the minimum.

All implants were stored in a 24-well plate after coating and the dynamic contact angle (advancing contact angle) was measured after different storage periods.

ZLA implants with a diameter of 3.3 mm were coated with selected substances. Implants with the following coatings were prepared: NaCl, MgCl$_2$, mixture of MgCl$_2$ and NaCl, glucose, dextran, mixture of dextran and SrCl$_2$.

The error bars in FIG. 6 show the highest and lowest values measured. The mean value is calculated based on three implants, those of substances marked with an asterisk (*) are calculated based on two implants only.

The results can be seen in FIG. 8: Dynamic contact angle (advancing contact angle) measurements of coated ZLA implants stored for 30 and 60 days and washed with ultra-pure water before measurement. The reference resulted in a value of 73° after 30 days and 96° after 60 days compared to all coated implants with values lower than 40°. NaCl coatings contained the highest value with 34.2° (30 days). These layers were not hygroscopic like MgCl$_2$ (DCA 18.9° after 30 days) or the mixture MgCl$_2$/NaCl with a DCA of 18.2° after 30 days. The saccharide coatings led to low DCA of 15.3° for glucose, 12.7° for dextran and 11.9° for the dextran/SrCl$_2$ coated implants after 60 days. SEM analyses (FIG. 9) of coated implants have shown that saccharide coatings formed smooth and thin layers with a closed surface over a wide area. All coating solutions were coloured with methylene blue. The layer thickness of dextran decreases towards the edge of the thread. The NaCl coating formed more crystals on the flank and edge of the thread with big non-coated areas in the valley of the thread. In comparison, the dextran coating led to much more complete layers.

Hygroscopic salts like MgCl2 and CaCl2) formed thin liquid layers over the ZLA implant surface. The 3.1% dextran coating was thicker than the 1 M NaCl coating (estimated by REM). The dextran coating covered the whole implant surface with a thickness that the structure of the implant was still visible by SEM.

The invention claimed is:

1. A dental implant made of a ceramic material comprising an implant surface having at least partially a contact angle of less than 20°, said implant surface being at least partially covered by a protective layer, wherein the protective layer comprises a water-soluble nonionic dextran having a molecular weight of more than 15,000 Da, and wherein the protective layer is adapted to dissolve upon contact with bodily fluids or water.

2. The dental implant according to claim 1, wherein the water-soluble nonionic dextran has a molecular weight of 35,000 to 50,000 Da.

3. The dental implant according to claim 2, wherein the molecular weight of the water-soluble nonionic dextran is about 40,000 Da.

4. The dental implant according to claim 1, wherein the protective layer additionally comprises at least one salt.

5. The dental implant according to claim 4, wherein said at least one salt is selected from the group consisting of NaCl, KCl, MgCl$_2$, CaCl$_2$, SrCl$_2$, KH$_2$PO$_4$, Na$_2$SO$_4$, and a mixture thereof.

6. The dental implant according to claim 4, wherein in the protective layer, a molar ratio of the water-soluble nonionic dextran to the at least one salt is between 1:1 and 1:10.

7. The dental implant according to claim 4, wherein the at least one salt is a divalent salt.

8. The dental implant according to claim 4, wherein said at least one salt is selected from the group consisting of SrCl$_2$ and MgCl$_2$.

9. The dental implant according to claim 4, wherein said at least one salt is SrCl$_2$.

10. The dental implant according to claim 4, wherein in the protective layer, a molar ratio of the water-soluble nonionic dextran to the at least one salt is between 1:1 and 1:5.

11. The dental implant according to claim 4, wherein in the protective layer, a molar ratio of the water-soluble nonionic dextran to the at least one salt is between 1:1 and 1:2.

12. The dental implant according to claim 1, wherein the protective layer has a thickness of 0.2 to 5 μm.

13. The dental implant according to claim 1, wherein the ceramic material comprises zirconia.

14. The dental implant according to claim 13, wherein the zirconia is an yttria stabilized zirconia.

15. The dental implant according to claim 1, wherein the dental implant comprises a body portion at an apical end thereof, and the surface of said body portion has a contact angle of less than 20°, which is essentially entirely covered by the protective layer.

16. The dental implant according to claim 1, wherein the dental implant has a storage stability of more than 4 months.

17. A method for preparing the dental implant according to claim 1, the method comprising:
    a) treating at least partially the implant surface of the dental implant to obtain the contact angle of less than 20°,
    b) covering at least partially the implant surface having the contact angle of less than 20° with an aqueous solution comprising at least the water-soluble nonionic dextran having the molecular weight of more than 15,000 Da, and
    c) drying said implant surface by removing at least partially the water from said implant surface to obtain the protective layer.

18. The method according to claim 17, wherein in step b) the implant surface is covered by dipping the implant into the aqueous solution.

19. The method according to claim 17, wherein in step c) the water is removed by microwave treatment, by airstream or by drying in a convection or a vacuum oven.

20. The method according to claim 17, wherein the aqueous solution comprises the water-soluble nonionic dextran having the molecular weight of more than 15,000 Da in a concentration of 1 to 10% (w/v).

21. The method according to claim 20, wherein the aqueous solution comprises the water-soluble nonionic dextran having the molecular weight of more than 15,000 Da in a concentration of 2.5 to 5% (w/v).

22. The method according to claim 21, wherein the aqueous solution comprises the water-soluble nonionic dextran having the molecular weight of more than 15,000 Da in a concentration of 3 to 4% (w/v).

23. The method according to claim 17, further comprising sterilizing the implant comprising the protective layer with ethylene oxide.

24. The dental implant according to claim 1, wherein the dental implant has a storage stability of 6 months.

25. The dental implant according to claim 1, wherein the dental implant has a storage stability of 24 months.

26. The dental implant according to claim 1, wherein the protective layer is configured to maintain a hydrophilicity of the implant surface.

27. The dental implant according to claim 1, wherein the protective layer is a coating, and the coating is applied on a surface of at least a threaded section of the dental implant.

28. The dental implant according to claim 1, wherein the protective layer is adapted to dissolve after implantation of the dental implant in a body.

* * * * *